Feb. 1, 1944. W. E. PAUL Re. 22,430

FLUID BLAST CIRCUIT BREAKER

Original Filed Nov. 3, 1938 3 Sheets-Sheet 1

Inventor:
William E. Paul,
by Harry E. Dunham
His Attorney.

Feb. 1, 1944. W. E. PAUL Re. 22,430

FLUID BLAST CIRCUIT BREAKER

Original Filed Nov. 3, 1938 3 Sheets-Sheet 2

Inventor:
William E. Paul,
by Harry E. Dunham
His Attorney.

Feb. 1, 1944. W. E. PAUL Re. 22,430

FLUID BLAST CIRCUIT BREAKER

Original Filed Nov. 3, 1938 3 Sheets-Sheet 3

Inventor:
William E. Paul,
by Harry E. Dunham
His Attorney.

Reissued Feb. 1, 1944

Re. 22,430

UNITED STATES PATENT OFFICE 22,430

FLUID BLAST CIRCUIT BREAKER

William E. Paul, Schenectady, N. Y., assignor to General Electric Company, a corporation of New York Original No. 2,284,840, dated June 2, 1942, Serial No. 238,632, November 3, 1938. Application for reissue August 19, 1942, Serial No. 455,352

10 Claims. (Cl. 200—148)

My invention relates to fluid blast circuit breakers, and more particularly to gas blast circuit breakers wherein a source of pressure, independent of the magnitude of the current to be interrupted, is utilized to effect arc interruption.

The principal object of my invention is the provision of an improved fluid blast circuit breaker that has high interrupting capacity and that is efficient and positive in operation throughout the entire rating of the circuit breaker.

More particularly, a further object of my invention is the provision of means in a fluid blast circuit breaker for segregating or isolating metallic vapor formed by the arc at the coacting contact surfaces so that the portion of the arc path subject to the fluid blast, is substantially free of said metallic vapor.

A further object of my invention is the provision in a fluid blast circuit breaker of improved blast producing means including a supplemental source of stored energy for supplementing and sustaining the fluid blast at the arc.

A further object of my invention is the provision of an improved operating means in a fluid blast circuit breaker of the character above defined for relating the contact structure to pneumatic operating means.

My invention will be more fully set forth in the following description referring to the accompanying drawings, and the features of novelty which characterize my invention will be pointed out with particularity in the claims annexed to and forming a part of this specification.

Figure 1:
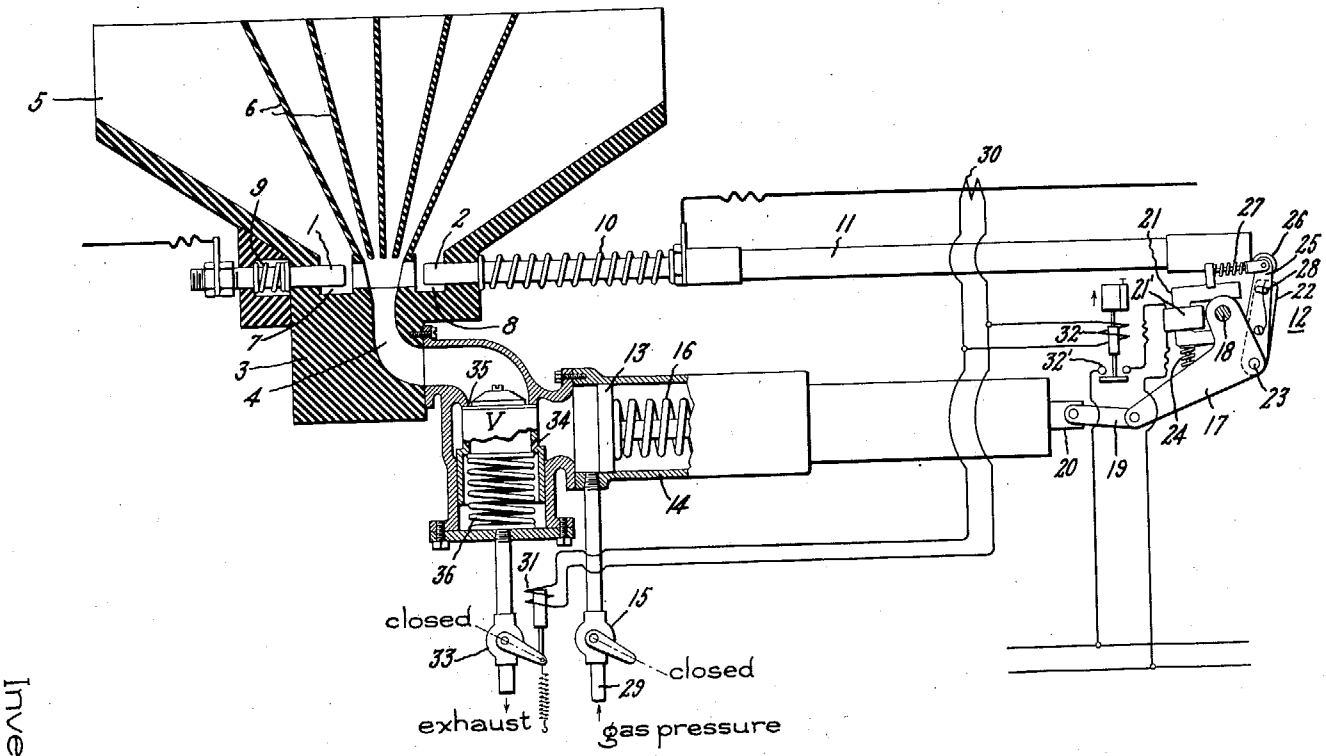
Figure 2:
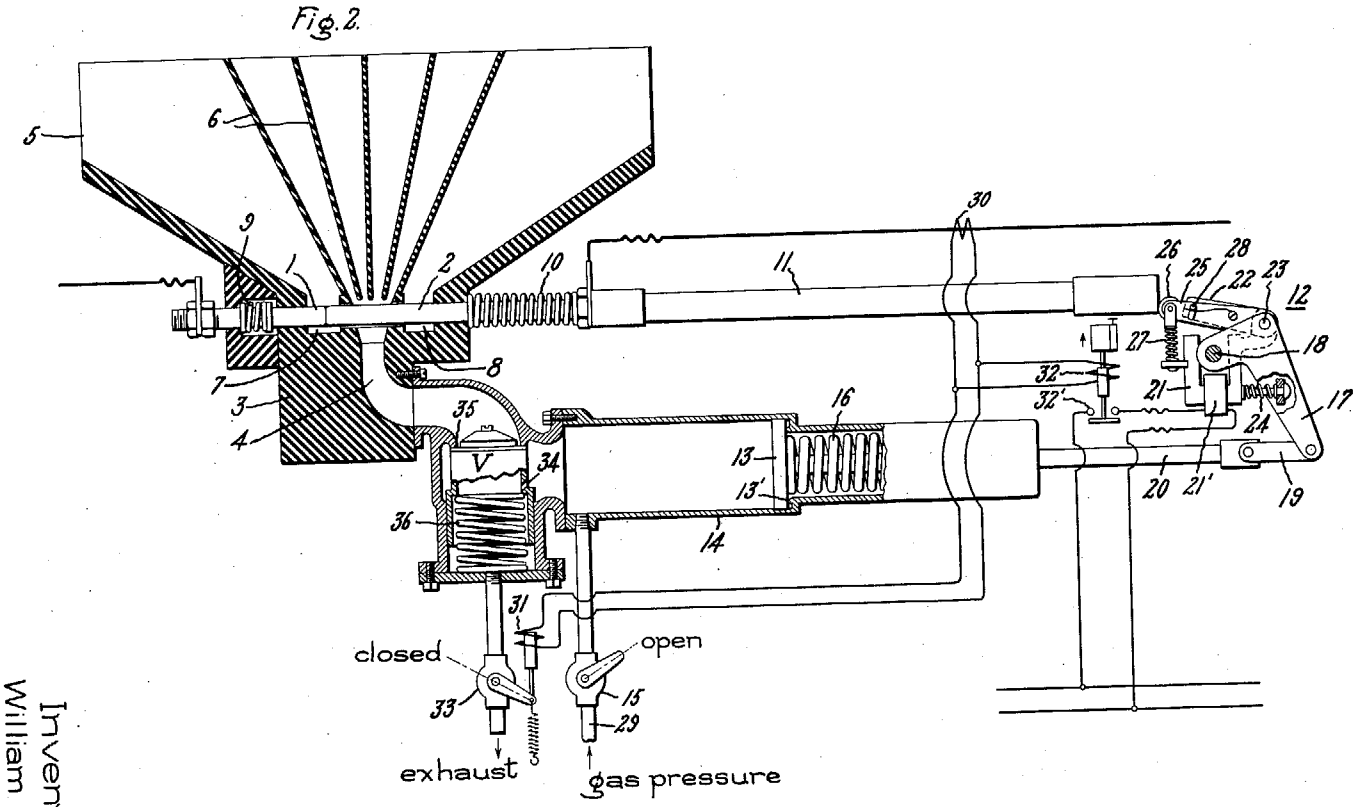
Figure 3:
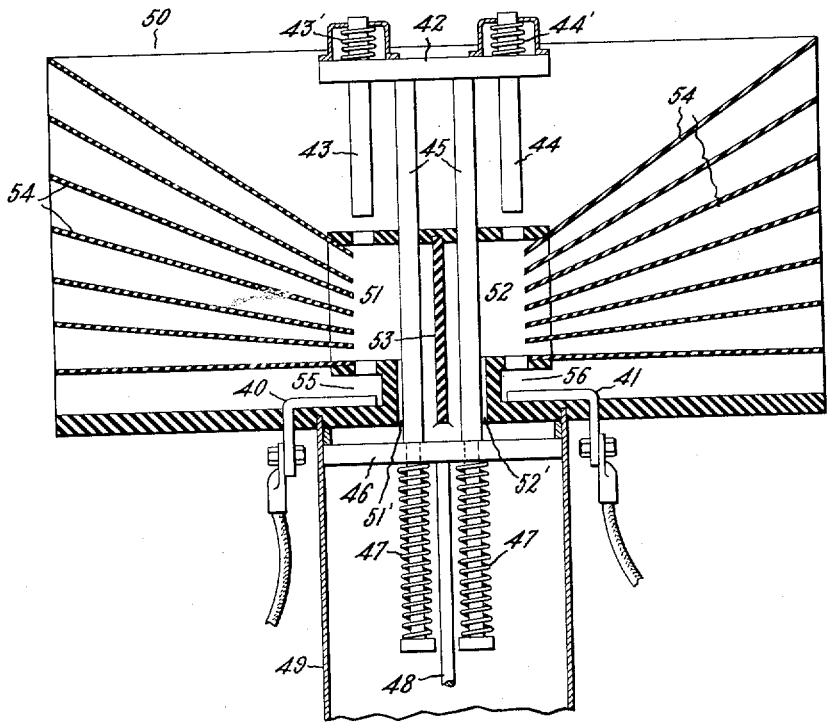

Referring to the drawings, Fig. 1 is an elevational view, partly in section and partly diagrammatically shown, of a fluid blast circuit breaker in the open circuit position thereof embodying the present invention, Fig. 2 is a similar view showing the circuit breaker in the closed circuit position, and Fig. 3 is a modified form of my invention illustrating a double-break type gas blast breaker.

The fluid blast circuit breaker specifically illustrated by Figs. 1 and 2 comprises a pair of relatively movable contacts 1 and 2 operable within an insulating casing 3 which forms a blast passage 4 for directing flow of gas through and transversely of the arc path upon separation of the contacts. The insulating casing 4 also includes an arc chute 5 having so-called insulating arc splitters 6 into which the arc is blown by the transverse blast.

In this form of circuit breaker, it has been found that a heavy current arc has a certain resistance to transverse movement that tends to diminish the effectiveness of the gas blast. That is, as the arc current increases, the blast pressure must be sufficient to overcome this arc resistance or back pressure so as to permit high velocity gas flow through the arc path, particularly when the alternating current passes through the zero value.

Heretofore the principal method of overcoming the arc resistance or back pressure consisted in utilizing comparatively high source pressures or in splitting the arc into a number of sections, all of which are subjected to a fluid blast.

I have found that this arc back pressure can be reduced, and the gas blast made more effective by segregating or isolating the metallic vapor that is evolved from the coacting contact surfaces by the arc heat so that this vapor is not present to any appreciable extent in that part of the arc path subject to the gas blast. By so segregating or isolating the metallic vapor, the arc path is also rendered less conducting, thereby further facilitating arc interruption by the blast at a current zero.

To this end the insulating casing 3, preferably at both sides of the blast passage 4, is provided with recesses or pockets 7 and 8 within which both terminals or extremities of the arc path are located in the separated position of the breaker contacts shown by Fig. 1. Since the contact material vaporized by the arc at one terminal at least is always wholly within one of said pockets, it will be apparent that the metallic vapor in the arc path can be limited to a very small amount.

As specifically illustrated, the contact 1 is substantially fixed and has a limited movement or "wipe" at the resilient mounting 9. The movable rod contact 2 is guided for reciprocal movement in the casing 3 and is operable across the blast passage 4 to engage the fixed contact 1. The contact 2 is normally biased by a spring 10 towards open circuit position, and in the closed circuit position, referring to Fig. 2, engages the contact 1 within the pocket 7. Accordingly, when the breaker is opened, the arc is initially formed in the pocket 7 and is drawn entirely across the blast passage 4 to the opposite pocket 8.

In view of the fact that an arc, so far as is known, does not actually transport matter such as metallic vapor from one point to another, the metallic vapor evolved at the butt-contact surfaces of 1 and 2 is not carried into the blast passage 4 except during the very brief interval during which the contact 2 moves across the passage. Accordingly, the metallic vapor is substantially segregated or isolated at the arc terminals or roots with respect to the gas blast intermediate portion of the arc. The metallic vapor is vented from the pockets in any suitable way, as through opposite ends of the arc chute 5.

It will be noted that the blast passage extending transversely of the intermediate portion of the arc path is of diverging shape so that the blast has high velocity at the intermediate portion of the arc opposite the arc splitters. The effectiveness of the gas blast is further increased by designing the blast passage so that the maximum gas velocity is at the entrance to the arc splitters, as contrasted with the usual method wherein the maximum velocity is at the point where the arc is formed. By restricting the blast passage at the approach to the arc and by locating the splitters in the diverging part immediately beyond the arc, the blast is made most effective at that point.

The operating means for the switch contacts comprises in the present instance an operating rod 11 that is related through tripping means, generally indicated at 12, to a piston 13. When the disengageable tripping device 12 releases the rod 11 with respect to the piston 13, the contact biasing spring 10 moves the contact 2 toward the open circuit position indicated in Fig. 1. The circuit closing operation can be effected when the tripping device 12 is reset, as illustrated, by admitting gas under pressure to the piston cylinder 14, as by means of a manually controlled valve 15. The piston 13 in moving toward the opposite end of the cylinder also compresses a spring 16 in addition to the circuit closing operation on the contact 2.

Referring more specifically to the tripping device 12 a crank 17 having a fixed pivot at 18 is connected at 19 to the piston rod extension 20. The crank 17 also has connected thereto a tripping magnet 21 and a coacting armature 22. As best illustrated by Fig. 2, the magnet and its armature are copivotally mounted on the crank at 23. The magnet 21 is also connected at 24 to the crank for limited movement with respect thereto. The magnet and crank are normally biased in opposite directions as shown.

A latch 25, copivotally mounted with respect to the armature 22 at 23, is provided with a roller 26 adapted to engage the end of the switch operating rod 11. The latch 25 is also mounted at 27 for limited movement with respect to the magnet 21 and is resiliently biased toward latching position. The armature 22 has a lost-motion connection, such as a pin and slot connection indicated at 28, with latch 25 so as to deliver a hammer blow to the latch in response to a tripping impulse.

When the device is in the closed circuit position, shown by Fig. 2, suitable energization of the magnet coil 21', in a manner hereinafter described, causes counterclockwise movement of the armature 22 so as to strike and trip the latch 25. When the roller 26 moves beneath the operating rod 11, the contact spring 10 operates the switch to the open circuit position previously described.

Referring particularly to Fig. 1, the circuit closing operation is initiated by opening in any suitable manner the valve 15 which connects the cylinder 14 with a source of gas pressure. In the position shown, cylinder 14 is closed by means of the main blast valve V which controls the admission of the gas from the source indicated at 29 to the blast gas passage 4. The movement of the piston 13 in response to gas pressure in cylinder 14 causes rotation of the crank 17 in a counterclockwise direction to close the contact 2 through the latch 25. It will be noted that the latch 25, after limited movement of the crank 17, must rotate with said crank by reason of the lost-motion connections at 24 and 27.

When the piston stroke is completed, the apparatus is in the position shown by Fig. 2 wherein it is held against the bias of springs 10 and 16 by the gas pressure from the line 29. Accordingly, in the closed position of the switch, the valve 15 remains open and is closed by any suitable means after a circuit interruption. Gas leakage from the cylinder 14 is prevented by the piston seating as a valve at 13'. The cylinder 14 therefore functions both as an expansible reservoir for storing gas under pressure and as contact operating means.

For opening the breaker, as in response to an overload or short circuit, the usual current transformer 30 can be related to suitable tripping relays for initiating both the gas blast and the circuit opening operation. As shown, the current transformer 30 can actuate both a valve operating relay 31 for initiating the gas blast and a time delay relay 32 for actuating the tripping device 12. The purpose of relay 32 is to synchronize the contact opening with the gas blast.

The relay 31 is operated instantaneously in response to a tripping impulse at 30 to open the exhaust valve 33 for releasing the pressure at the lower side of the blast valve V. Normally the pressure is equalized on both sides of the valve by reason of a bleed vent 34 and the valve is seated at 35 under bias of the valve spring 36. Therefore, when the pressure is unbalanced by opening of the exhaust valve 33, the pressure in the cylinder 14 causes instant opening of the valve V and a high velocity gas blast through the switch passage 4. The stored blast energy in the cylinder or reservoir 14, therefore, insures an immediate supply of a large volume of gas for blast purposes so that the supply line 29 need not be of large size. This is important where the gas supply must be conserved.

For the purpose of insuring a gas blast at the instant of contact separation, there is introduced a slight delay by means of relay 32 in actuating the tripping device 12. The relay 32 closes the energizing circuit of the coil 21' at 32' after a predetermined delay to trip the breaker in the manner above described.

Coincident with or slightly before the tripping operation, the piston spring 16 starts to deliver its stored energy to supplement and sustain the main arc interrupting blast. As the valve V opens, the pressure within the cylinder 14 immediately drops so that the high initial blast velocity would not be maintained except for the sustaining blast by the piston 13. In view of the fact that the arc is generally interrupted within a very few cycles, it will be apparent that the piston 13 is effective to maintain the blast at high velocity for a sufficient interruption period.

It will be noted that the contact opening movement is independent of the speed of the return stroke of the piston. With this arrangement the stored energy imparted to the piston serves to maintain a high velocity blast across the arc path an appreciable time after full contact separation. The ararngement also permits high speed opening of the switch since the opening spring 10 need accelerate only the movable contact and its operating rod.

The mechanism is reset when the piston 13 reaches the end of its stroke, as shown in Fig. 1.

The tripping device 12 is rotated clockwise during the return stroke of the piston and the resilient connection at 27 serves to bias the latch roller 26 behind the contact operating rod 11 at the end of the stroke. It will be noted that the mechanism is "trip-free" near the end of the closing stroke since the latch 25 can be actuated by the magnet 21 to release the contact 2 at this part of the stroke.

The control means for the valve 15 can be of any suitable type and is shown as manually operated for purposes of clearness. It will be obvious, however, that a remote control system can be employed for opening the valve to initiate the closing operation and for automatically closing the valve when the circuit is interrupted.

Referring to the double-break modification illustrated by Fig. 3, the gas blast circuit breaker comprises essentially a pair of fixed terminal contacts 40 and 41 arranged to be engaged and bridged by a movable contact 42 having rod contact portions 43 and 44. The rod contacts 43 and 44 make butt contact engagement with the fixed contacts and are resiliently mounted at 43' and 44', respectively, on the bridging member for limited overtravel or "wipe." The bridging member is operated by a pair of insulating rods 45 that are operatively connected to a piston 46 through a resilient connection 47. The piston 46 in turn is connected to an operating rod 48 guided with respect to the piston cylinder 49. The operating rod can be connected to suitable actuating mechanism (not shown). It will, therefore, be noted that the arrangement is such that opening movement of the contacts through the operating rod 48 also is accompanied by movement of the piston 46 in a direction to direct a gas blast in the direction of the contacts.

For the purpose of directing the gas blast effectively into the arc paths formed between the separating contacts, the piston cylinder 49 is adapted to communicate with an arcing chamber and chute structure generally indicated at 50. The arc chute includes a pair of insulating arc chambers 51 and 52 separated in the present instance by an insulating partition 53. Each chamber is arranged to be in communication with the cylinder 49 through passages 51' and 52' respectively. The contacts 43 and 44 in opening pass through the chambers 51 and 52, respectively, and a plurality of arc splitters 54 are disposed in the chute transversely of the arc path at the opposite open sides of the arc chambers. The arc gases are therefore directed in opposite directions from the two breaks so that the danger of "flash-over," where high voltages are involved, is minimized.

For the purpose of segregating the metallic vapor formed by the arc, the arcing chambers 51 and 52 are arranged so that both terminals of the arc can be exteriorly of the arc chambers, and hence removed from the main gas blast, when the contacts are in the separated position shown. To this end the chambers overhang, in vertical spaced relation, the fixed contacts so as to form pockets 55 and 56 for segregating the metallic vapor at the points of initial arc formation. As illustrated, the metallic vapor is vented at opposite sides of the arc chute and does not enter the arc path. In the same manner the metallic vapor at the contacts 43 and 44 can be vented through the upper open end of the chute.

An advantage of the present arrangement is that the double break, in combination with the arc splitters, provides a comparatively long creepage path for preventing restriking of the arc at high voltages. Another important advantage is that the loop in the circuit at the arc chambers causes the magnetic forces to be utilized so as to assist the gas blast in driving the arcs into the arc splitters. That is, the magnetic forces set up by the current to be interrupted tend to drive the arcs into the arc splitters independently of the gas blast so that the latter thereby can be even more effective.

In operation it will be noted that the lost motion resilient connections at 47 between the piston 46 and the bridging contact 42 permits an initially high acceleration independently of the bridging contact so that there is present an effective gas blast at the instant of contact separation. After predetermined travel of the piston 46, the contact rods 45 are directly engaged to insure positive separation of the contacts. This contact opening speed is very high since the movable contact structure is automatically picked up and accelerated by the inertia of the piston and operating mechanism which are at this point moving at high speed.

It should be understood that my invention is not limited to specific details of construction and arrangement thereof herein illustrated, and that changes and modifications may occur to one skilled in the art without departing from the spirit of my invention.

What I claim as new and desire to secure by Letters Patent of the United States is:

1. An electric air circuit breaker of the cross blast type comprising relatively movable contacts, independent pressure means for directing a fluid blast transversely through the arc path formed upon separation of said contacts, and means for segregating and dissipating metallic vapor formed by the arc at each contact surface at the opposite extremities of the arc path, said metallic vapor being dissipated in directions away from said arc path so that the intermediate part of the arc path subject to said fluid blast is substantially free of said vapor.

2. An electric air circuit breaker of the cross blast type comprising a pair of relatively movable contacts, an independent source of fluid pressure, insulating means forming a fluid passage from said source extending transversely of the arc path formed upon separation of said contacts, said insulating means forming pockets at opposite sides of said fluid passage and separate therefrom, and means for effecting separation of said contacts so that the extremities of the arc path are located substantially within said pockets, said pockets being vented independently of said fluid passages.

3. An electric air circuit breaker of the cross blast type comprising a pair of relatively movable contacts, means forming a fluid passage for directing under pressure a fluid blast substantially transversely of and through an intermediate section of the arc path formed upon separation of said contacts, and insulating barrier means disposed adjacent each side of the said passage and offset with respect to said fluid blast beyond which each end of the arc is drawn for segregating metallic vapor formed at the corresponding contact surfaces, said insulating barrier means defining passages for venting said metallic vapor to atmosphere independently of the arc path.

4. An electric circuit breaker of the gas blast type comprising relatively movable contacts, means for separating said contacts, passage means for directing a gas blast through the arc path formed upon contact separation, a main source of pressure for said gas blast, and a second supplementary source of blast energy including a spring arranged normally to be held under tension by the pressure from said first source, said main and supplementary sources both communicating with said passage means for interrupting the arc.

5. An electric circuit breaker of the gas blast type comprising relatively movable contacts, means for separating said contacts, means for directing a gas blast through the arc path formed upon contact separation, a source of pressure for said gas blast, a blast valve for controlling admission of gas from said source directly to said contacts, and a second supplementary source of blast energy including an expansible reservoir arranged normally to be under pressure from said first source, said valve also controlling admission of gas from said reservoir to said contacts so that opening of said valve releases said reservoir energy for sustaining the blast from said first source.

6. An electric circuit breaker of the gas blast type comprising relatively movable contacts, a fluid passage for directing a gas blast through the arc path formed by contact separation, a source of pressure for said gas blast, a blast controlling valve directly interposed with respect to said source and passage, a cylinder having a spring biased piston arranged to be in communication with said source in the closed position of said contacts independently of said blast valve whereby said piston is biased to a spring charging position, said valve also interposed with respect to said piston and passage, and means for opening said blast valve whereby the gas blast from said source is supplemented by said spring charged piston and directed through said passage for interrupting the arc upon separation of said contacts.

7. An electric circuit breaker of the gas blast type comprising relatively movable contacts, means for directing a gas blast through the arc path formed upon contact separation, a source of blast energy comprising a spring charged piston, and tripping means for relating said piston to said contacts whereby circuit closing movement thereof is effected coincident with the spring charging operation on said piston, said tripping means being effective to release said contacts and piston whereby independent movement of each is permitted during the circuit opening operation.

8. A gas blast circuit breaker comprising separable contacts arranged to form two breaks in series, insulating arc chamber means within which said breaks are formed, said chamber means having apertures through which the arcs at said breaks are drawn so that the extremities of said arcs are exteriorly of said chamber, said chamber also opening to exhaust the arc gases at each break in opposite directions, the aforesaid exterior extremities of said arc being vented directly to atmosphere independently of said chamber exhaust opening, arc splitters at said exhaust openings, means for directing gas under pressure into said chamber means upon separation of said contacts to interrupt arcing at said splitters, and means for operating said contacts.

9. A gas blast circuit breaker comprising a pair of fixed contacts, a coacting bridging contact arranged to form two breaks in the circuit, insulating means including barriers extending transversely of the arcs at said breaks for partially confining the arcs formed at said breaks, said barriers having apertures through which said arcs are drawn so that but the intermediate portions of each arc are confined by said insulating means, said confining means opening in opposite directions corresponding to the directions in which said arcs are biased by the magnetic forces thereof, the extremities of said arcs being vented directly to atmosphere independently of the opposite openings in said confining means, a plurality of arc splitters at said exhaust openings, and means for directing gas under pressure into said confining means to drive said arcs into said arc splitters in accordance with the contact opening operation.

10. A gas blast circuit breaker comprising an insulating arc chute having a comparatively narrow entrance portion and a flared exhaust portion, relatively movable contacts separable at said entrance portion, means defining a fluid passage for directing a gas blast into said chute at said entrance portion and transversely of the arc path formed upon separation of said contacts, and a plurality of insulating arc splitters disposed in said chute and extending edgewise in spaced flaring relation from points adjacent to said arc path toward the chute exhaust so as to define a plurality of blast passages through said chute, one of said arc splitters forming with said chute a passage off-set with respect to said blast passages so that it is not traversed by the main gas blast, said off-set passage being in communication with one of said contacts for venting arc gases and vapors at said contact independently of the main arc interrupting blast.

WILLIAM E. PAUL.